No. 806,136. PATENTED DEC. 5, 1905.
W. T. HANNA.
VEHICLE HUB.
APPLICATION FILED FEB. 27, 1905.
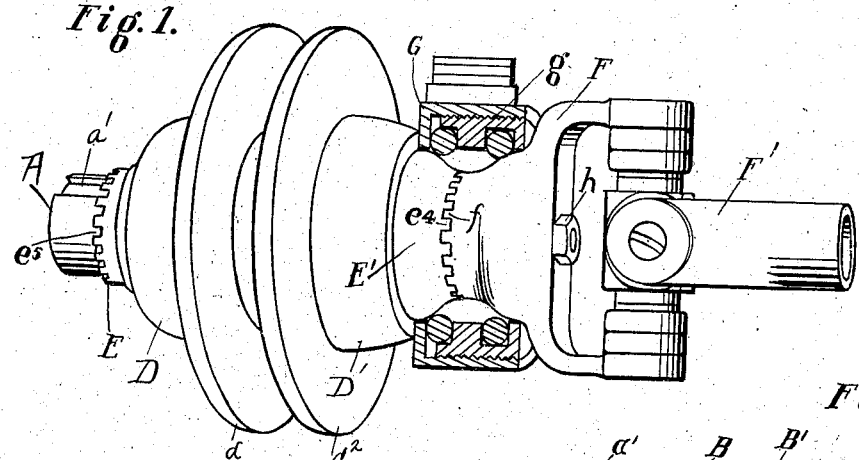
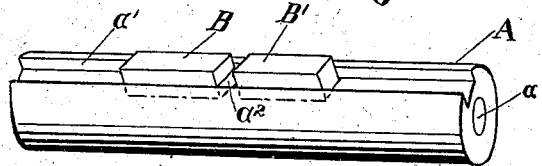
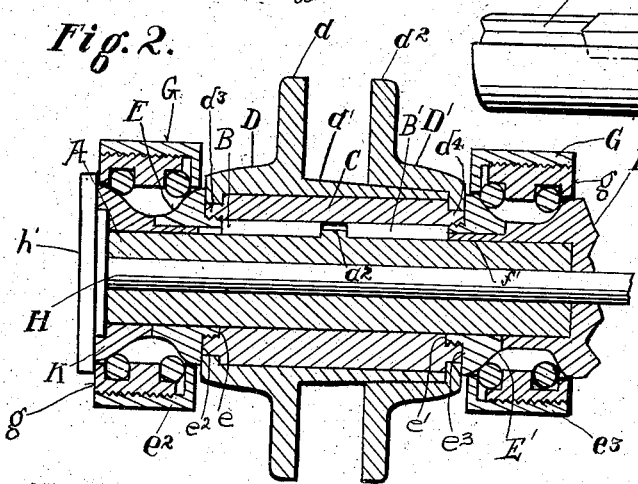
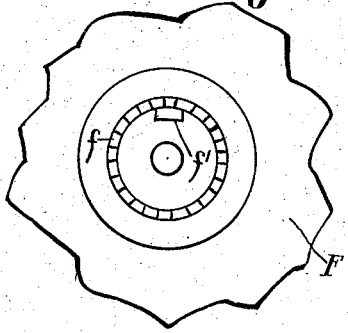
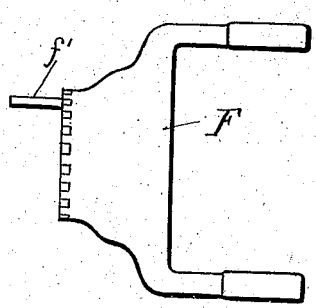
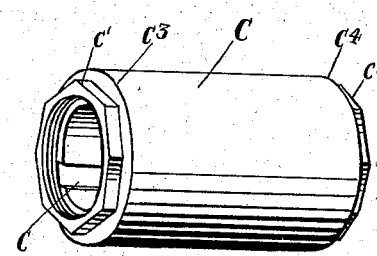
WITNESSES:
INVENTOR.
William T. Hanna
BY Walker G. Murray
ATTORNEY.

UNITED STATES PATENT OFFICE.

WILLIAM T. HANNA, OF CINCINNATI, OHIO, ASSIGNOR TO MARTHA A. HANNA, OF CINCINNATI, OHIO.

VEHICLE-HUB.

No. 806,136.

Specification of Letters Patent.

Patented Dec. 5, 1905.

Application filed February 27, 1905. Serial No. 247,431.

*To all whom it may concern:*

Be it known that I, WILLIAM T. HANNA, a citizen of the United States of America, and a resident of Cincinnati, county of Hamilton, State of Ohio, have invented certain new and useful Improvements in Vehicle-Hubs, of which the following is a specification.

The object of my invention is a vehicle-hub especially adapted for use in automobiles, so that the wheel may be removed readily and as readily replaced in its bearings for the purpose of repairing the tire or other parts of the wheel.

Referring to the drawings, in which like parts are indicated by similar reference-letters in the various views, Figure 1 is a perspective view of the hub embodying my invention, one of the journal-bearings being shown in section. Fig. 2 is a central sectional view of the hub. Fig. 3 is a detail side elevation of the member of the coupling which joins the hub to the main shaft. Fig. 4 is a detail perspective view of the central axle of the hub. Fig. 5 is a front elevation of the coupling shown in Fig. 3. Fig. 6 is a perspective view of the sleeve within which the axle fits.

Referring to the parts, axle A has a longitudinal central bore $a$ and upon its periphery a longitudinal groove $a'$, which is centrally intercepted by a bridge $a^2$. Within groove $a'$, upon opposite sides of the bridge $a^2$, keys B B' fit. Sleeve C has a central bore to fit snugly over axle A and a longitudinal groove $c$ to register with groove $a'$ and to form therewith a keyway for keys B B'. The ends $c'$ $c^2$ of the sleeve are reduced to form shoulders $c^3$ $c^4$, the ends being made octagonal and being internally screw-threaded.

Over the sleeve C fits the external housing of the hub, which consists of shells D D'. Shell D has a vertical circular flange $d$ and an elongated annular flange $d'$, over which the shell D' fits. Shell D' has a vertical flange $d^2$, similar to flange $d$. Shells D D' have inwardly-projecting octagonal flanges $d^3$ $d^4$ to engage collars $c'$ $c^2$ of the hub C and to abut against shoulders $c^3$ $c^4$ thereof. Between the flanges $d$ $d^2$ the spokes are to be held in the usual manner.

The hub is held upon the axle A by means of nuts E E', which have external screw-threaded flanges $e$ $e'$ to engage the screw-threads upon the ends of the sleeve C and have shoulders $e^2$ $e^3$ to abut against the ends of the sleeve C and the shells D D'. Nut E' has teeth $e^4$, which are to be engaged by the teeth $f$ of the member F of a universal coupling. The member F of the coupling has likewise a stud $f'$ to engage the groove $a'$. The sleeves E E' and the coupling F are grooved upon their exterior to form ball-bearing surfaces.

In Fig. 1 I have shown the inner bearing G, in which the hub rotates, a similar bearing being provided for the nut E. The coupling F is held in mesh with the teeth $e^4$ by means of a bolt H, which extends through the bore $a$ of the axle and receives upon its end a nut $h$, as illustrated in Fig. 1. The head $h'$ of the bolt H bears against a cap K, which has teeth similar to teeth $f$ to mesh with teeth $e^5$ upon nut E. The periphery of cap K is grooved similar to nut E to form ball-bearing surfaces.

Nuts E E' are made of a size such that when the caps $g$ have been removed from bearing G the nuts E E' may be drawn through the bearings G.

In operation rotation is imparted to the hub by means of the universal coupling F F', which connects the hub to the source of power.

When it is desired to remove the wheel from its bearings, nut $h$ is removed from the bolt H and the bolt is then withdrawn from the hub. Then the caps $g$ of each bearing, with the balls, having been removed from the boxes G, the nuts E and E' are drawn through the boxes G. Then the axle can be drawn through hub and the wheel may be dropped down between the bearings and removed for repairs. In replacing the wheel after the hub has been brought in alinement with the bearings the axle is inserted, the nuts E E' screwed in place, and the caps K and the coupling F brought into position and secured in place by the bolt H.

What I claim is—

1. The combination of a short axle having in its periphery a longitudinal groove intercepted by a bridge, a hub to fit over the axle and having a groove to form a keyway with the groove in the axle, keys seated in the keyway upon opposite sides of the bridge and nuts to engage the hub and to abut against the keys.

2. A short axle having in its periphery a longitudinal groove intercepted by a bridge, a hub to fit over the axle and having a groove to form a keyway with the groove in the axle, keys seated in the keyway upon opposite sides of the bridge, nuts to engage the hub and to abut against the keys and having bearing-surfaces formed upon their exteriors in combination with two journal-bearings adapted to receive the nuts and a coupling to engage the hub at one side to impart rotation thereto.

3. The combination of a short axle having in its periphery a longitudinal groove intercepted by a bridge, a hub consisting of an interior sleeve and an external housing, the sleeve to fit over the axle and having a groove to form a keyway with the groove in the axle, keys seated in the way upon opposite sides of the bridge and nuts to engage the sleeve and abut against the ends of the housing and against the keys.

4. The combination of a short axle having in its periphery a longitudinal groove intercepted by a bridge, a hub consisting of an interior sleeve and an external housing, the sleeve to fit over the axle and having a groove to form a keyway with the groove in the axle, the housing consisting of two shells, one having an elongated annular flange to fit over the sleeve and a transverse flange, and the other shell fitting over the annular flange of the first shell and having a transverse flange to form with the aforesaid transverse flange a way for the spokes and nuts to engage the sleeve and to bear against the outer ends of the shells.

5. The combination of a short axle having a longitudinal groove intercepted by a bridge in its periphery, a hub consisting of an internal sleeve and a housing, the sleeve having an internal groove to register with the groove in the axle and having its ends reduced, the reduced ends having their periphery formed angularly, the housing consisting of two shells having at their ends downwardly-projecting angular flanges to engage the reduced end of the sleeve, keys seated in the keyway upon opposite sides of the bridge and nuts engaging the ends of the sleeve and abutting against the shells.

6. The combination of two journal-bearings, a hub, a short axle passing through the hub, keys for engaging the axle, nuts for engaging the hub and the keys to lock the hub upon the axle, the nuts being formed with bearing-surfaces for seating in the journal-bearings, caps for engaging the nuts and means for locking the caps upon the axle.

WILLIAM T. HANNA.

Witnesses:
 WALTER F. MURRAY,
 AGNES McCORMACK.